United States Patent
Ittelson et al.

(10) Patent No.: US 12,206,515 B2
(45) Date of Patent: Jan. 21, 2025

(54) VERIFYING USER IDENTITIES FOR ADMISSION TO VIDEO CONFERENCES

(71) Applicant: Zoom Video Communications, Inc., San Jose, CA (US)

(72) Inventors: Brendan James Ittelson, San Jose, CA (US); Shawn Michael Rolin, Saratoga, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/418,480

(22) Filed: Jan. 22, 2024

(65) Prior Publication Data

US 2024/0163122 A1    May 16, 2024

Related U.S. Application Data

(63) Continuation of application No. 18/100,042, filed on Jan. 23, 2023, now Pat. No. 11,888,632, which is a continuation of application No. 17/161,853, filed on Jan. 29, 2021, now Pat. No. 11,588,657.

(51) Int. Cl.
| | |
|---|---|
| H04L 12/18 | (2006.01) |
| H04L 65/403 | (2022.01) |
| H04N 7/15 | (2006.01) |

(52) U.S. Cl.
CPC ........ *H04L 12/1818* (2013.01); *H04L 65/403* (2013.01); *H04N 7/15* (2013.01)

(58) Field of Classification Search
CPC ...... H04N 7/15; H04L 65/403; H04L 12/1818
USPC ....................................................... 709/204
See application file for complete search history.

(56) References Cited

U.S. PATENT DOCUMENTS

| | | | |
|---|---|---|---|
| 6,850,985 | B1 | 2/2005 | Giloi et al. |
| 8,576,270 | B1 | 11/2013 | Vitale et al. |
| 11,290,539 | B2 | 3/2022 | Yin et al. |
| 11,588,657 | B2 | 2/2023 | Rolin et al. |
| 11,888,632 | B2 | 1/2024 | Rolin et al. |
| 2007/0100940 | A1 | 5/2007 | Eriksson |
| 2009/0019170 | A1 | 1/2009 | Wyss et al. |

(Continued)

OTHER PUBLICATIONS

PCT App. No. PCT/US2022/012239, "International Preliminary Report on Patentability", Aug. 10, 2023, 9 pages.

(Continued)

*Primary Examiner* — Lan Dai T Truong
(74) *Attorney, Agent, or Firm* — Kilpatrick Townsend & Stockton LLP

(57) ABSTRACT

One example method for controlling online meeting attendance includes obtaining meeting information associated with a meeting, the meeting information comprising a meeting identifier; receiving, by a video conferencing system from a client device, a request to join the meeting, the request comprising the meeting identifier; receiving a user identifier corresponding to a user; accessing a set of guest identifiers corresponding to a plurality of meeting guests invited to the meeting; determining that the user is a meeting guest of the plurality of meeting guests based on the user identifier and a correspondence to a guest identifier of the set of guest identifier, wherein the user identifier is not in the set of guest identifiers; and responsive to determining that the user is a meeting guest of the plurality of meeting guests, connecting the client device to the meeting.

20 Claims, 7 Drawing Sheets

(56) References Cited

U.S. PATENT DOCUMENTS

| | | |
|---|---|---|
| 2009/0080633 A1 | 3/2009 | Shi |
| 2013/0282803 A1 | 10/2013 | Boyer et al. |
| 2014/0104372 A1* | 4/2014 | Calman ................... H04N 7/15 |
| | | 348/E7.084 |
| 2018/0103074 A1 | 4/2018 | Rosenberg |
| 2018/0278605 A1 | 9/2018 | Fitterer et al. |
| 2019/0318283 A1 | 10/2019 | Kelly et al. |
| 2020/0106814 A1 | 4/2020 | La Barrie et al. |
| 2020/0372140 A1* | 11/2020 | Jaber ....................... G06F 21/31 |

OTHER PUBLICATIONS

PCT App. No. PCT/US2022/012239, "International Search Report and Written Opinion", Apr. 8, 2022, 12 pages.

\* cited by examiner

VERIFYING USER IDENTITIES FOR ADMISSION TO VIDEO CONFERENCES

CROSS-REFERENCE TO RELATED APPLICATIONS

This application is a continuation of U.S. patent application Ser. No. 18/100,042, filed Jan. 23, 2023, now U.S. Pat. No. 11,888,632, which is a continuation of U.S. patent application Ser. No. 17/161,853, filed Jan. 29, 2021, now U.S. Pat. No. 11,588,657, titled "Controlling Online Meeting Attendance," the entireties of both of which are hereby inherited by reference.

FIELD

The present application generally relates to video conferences and more particularly relates to systems and methods for controlling online meeting attendance.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for controlling online meeting attendance. One example method includes generating meeting information for a meeting, the meeting information comprising a meeting identifier; obtaining a set of guest identifiers corresponding to a plurality of meeting guests, each guest identifier being unique within the set of guest identifiers and corresponding to a different meeting guest; initiating the meeting by a video conferencing system using the meeting identifier; receiving, by the video conferencing system from a first client device, a first request to join the meeting, the first request comprising the meeting identifier; receiving a first user identifier corresponding to a first user, the first user identifier not being in the set of guest identifiers; determining that the first user is a first meeting guest of the plurality of meeting guests based on the first user identifier and a correspondence to a guest identifier of the set of guest identifiers; and responsive to determining that the first user is the first meeting guest, connecting the first client device to the meeting.

Another example method includes obtaining meeting information associated with a meeting, the meeting information comprising a meeting identifier; receiving, by a video conferencing system from a first client device, a first request to join the meeting, the first request comprising the meeting identifier; receiving a first user identifier corresponding to a first user; accessing a set of guest identifiers corresponding to a plurality of meeting guests invited to the meeting, each guest identifier being unique within the set of guest identifiers and corresponding to a different meeting guest; determining that the first user is a first meeting guest of the plurality of meeting guests based on the first user identifier and a correspondence to a guest identifier of the set of guest identifier, wherein the first user identifier is not in the set of guest identifiers; and responsive to determining that the first user is a meeting guest of the plurality of meeting guests, connecting the first client device to the meeting.

An example system includes a non-transitory computer-readable medium; a communications interface; and a processor communicatively coupled to the non-transitory computer-readable medium and the communications interface, the processor configured to execute processor-executable instructions stored in the non-transitory computer-readable medium to: obtain meeting information associated with a meeting, the meeting information comprising a meeting identifier; receive, by a video conferencing system from a first client device using the communications interface, a first request to join the meeting, the first request comprising the meeting identifier; receive, via the communications interface, a first user identifier corresponding to a first user; access a set of guest identifiers corresponding to a plurality of meeting guests invited to the meeting, each guest identifier being unique within the set of guest identifiers and corresponding to a different meeting guest; determine that the first user is a first meeting guest of the plurality of meeting guests based on the first user identifier and a correspondence to a guest identifier of the set of guest identifier, wherein the first user identifier is not in the set of guest identifiers; and responsive to a determination that the first user is a meeting guest of the plurality of meeting guests, connect the first client device to the meeting.

One example non-transitory computer-readable medium includes processor executable instructions to cause a processor to obtain meeting information associated with a meeting, the meeting information comprising a meeting identifier; receive, by a video conferencing system from a first client device using a communications interface, a first request to join the meeting, the first request comprising the meeting identifier; receive, via the communications interface, a first user identifier corresponding to a first user; access a set of guest identifiers corresponding to a plurality of meeting guests invited to the meeting, each guest identifier being unique within the set of guest identifiers and corresponding to a different meeting guest; determine that the first user is a first meeting guest of the plurality of meeting guests based on the first user identifier and a correspondence to a guest identifier of the set of guest identifier, wherein the first user identifier is not in the set of guest identifiers; and responsive to a determination that the first user is a meeting guest of the plurality of meeting guests, connect the first client device to the meeting.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
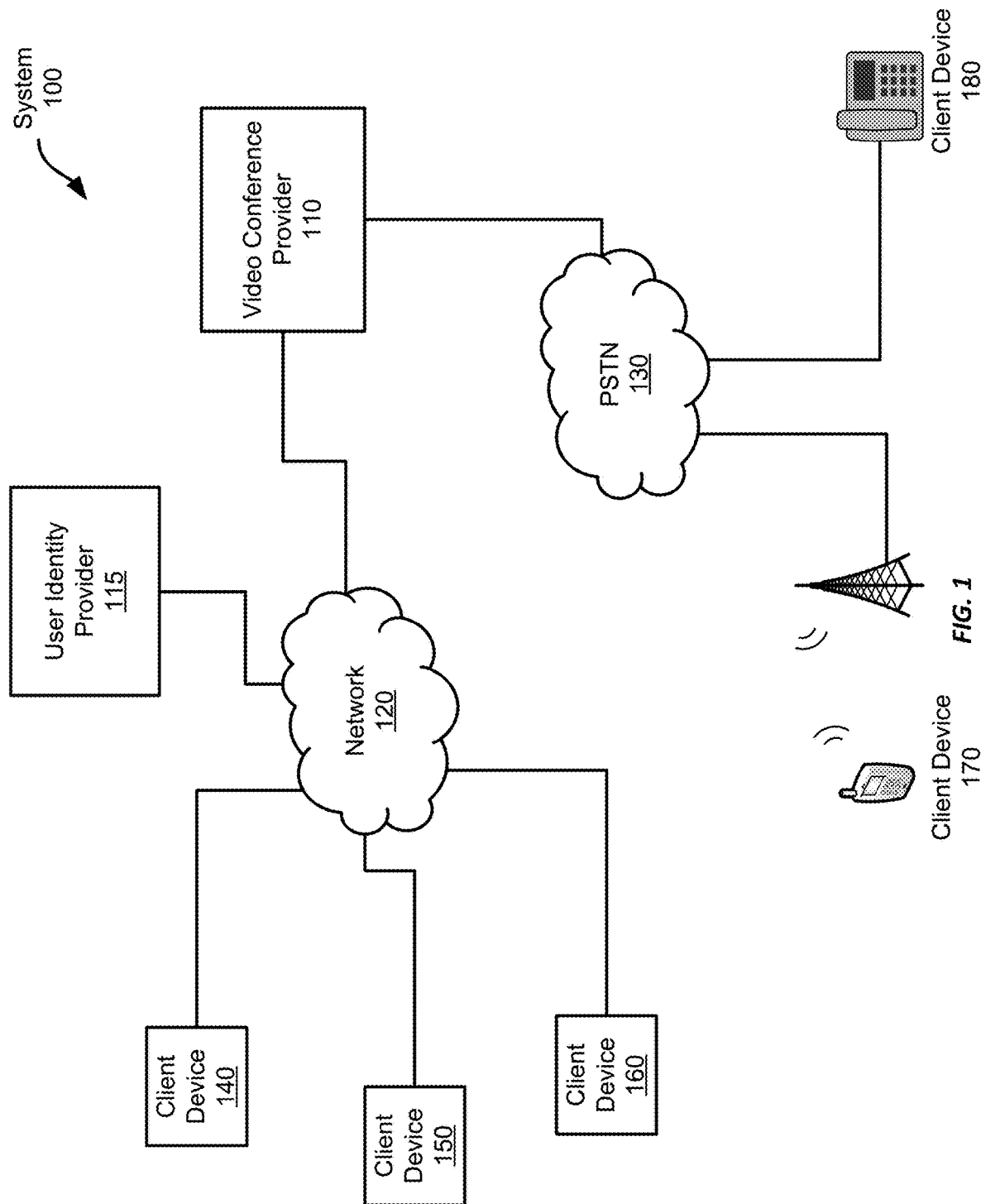
FIGS. 1-4 illustrate example video conference systems to enable controlling online meeting attendance.

Examples are described herein in the context of systems and methods for controlling online meeting attendance. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing systems enable their users to create and attend video conferences (or "meetings") via various types of client devices. After joining a meeting, the participants receive audio and video streams or feeds (or "multimedia" streams or feeds) from the other participants and are presented with views of the video feeds from one or more of the other participants and audio from the audio feeds. Using these different modalities, the participants can see and hear each other, engage more deeply, and generally have a richer experience despite not being physically in the same space.

To create a meeting, a person (referred to as the "host" or "meeting host") accesses the video conferencing system, creates a new meeting, and identifies one or more other people to invite to the meeting. In response to the host creating the meeting, the video conference system establishes the meeting by creating a meeting identifier and, optionally, a passcode or other access control information. The host can then send the meeting identifier (and access control information) to each of the invitees, such as by email.

Once the meeting is started, the invitees can then access and join the meeting using the meeting identifier and any provided access control information. If an invitee provides the meeting code and the correct access control information, the user is admitted to the meeting and can interact with the other participants. But if the meeting code or the access control information is incorrect, the user is denied access to the meeting.

A difficulty with such a scheme, however, is that some video conference systems may employ access control information that is common to all invitees. Thus, rather than each user receiving personalized access control information, e.g., a passcode, they will receive the same passcode as every other invitee. As a result, individuals who were not invited to the meeting, but otherwise obtained the meeting identifier and the passcode, are able to join the meeting. This can create many problems, including breached confidentiality or meeting disruptions created by malicious actors.

To help prevent uninvited users from joining a meeting, a video conferencing system according to this disclosure enables a host to invite users to a meeting as described above via a desired communications mechanism, such as email. To send the invitations, the host provides the contact information for each of the invitees, e.g., their email addresses, social media handles, etc. to the video conference system as a part of an invite list. Once the host has added all desired invitees, they instruct the video conference system to send the invitations to the invitees.

When the host starts the meeting, invitees may then use the meeting identifier and access control information from the received meeting invitation to access the meeting. However, to prevent uninvited users from joining, each participant sends additional information to the video conference system referred to as a "user identifier." The user identifier may be a screen name or alias, an account name or account identifier with the video conference system, identity information from a trusted third party or identity provider (e.g., a business or other organization), etc. that was not used by the host to send the invitation. Thus, while the host may provide email addresses to the video conferencing system, they would not provide (and may not know) the user identifiers for the invitees. The video conferencing system may accomplish this by only allowing the host to use contact information, such as an email address, social media handle, telephone number, etc. As mentioned above, when a user attempts to join the meeting, they provide the meeting code and access control information, but also their user identifier. If the meeting code and access control information match the information for the meeting, the video conference system then uses the user identifier to determine if the user is a valid participant for the meeting. To do so, the video conference system determines a correspondence between the user identifier and the contact information for users on the invite list. For example, if the user provides user account information for the video conference system, e.g., a user number or account name, the video conference system can determine whether contact information is associated with the identified user account. If contact information matching an invitee on the invite list is identified, the video conference system determines that the user is one of the invitees and admits them to the meeting.

Thus, the video conference system is able to control which users are admitted to a meeting, despite all of the meeting information being generally available to every invitee, and potentially many more people, if the meeting information has been shared, e.g., on social media. In addition, such a scheme does not require that a meeting host have any information about the invitees other than their contact information. Further, because the other invitees most likely do not know or have access to any other invitee's user identifier, it would be difficult for one user to impersonate another user. By using such techniques, the video conferencing system can effectively limit meeting participants to only the invitees, thereby helping ensure confidentiality of the meeting and preventing potential disruptions from uninvited guests.

This illustrative example is given to introduce the reader to the general subject matter discussed herein and the disclosure is not limited to this example. The following sections describe various additional non-limiting examples and examples of systems and methods for controlling online meeting attendance.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
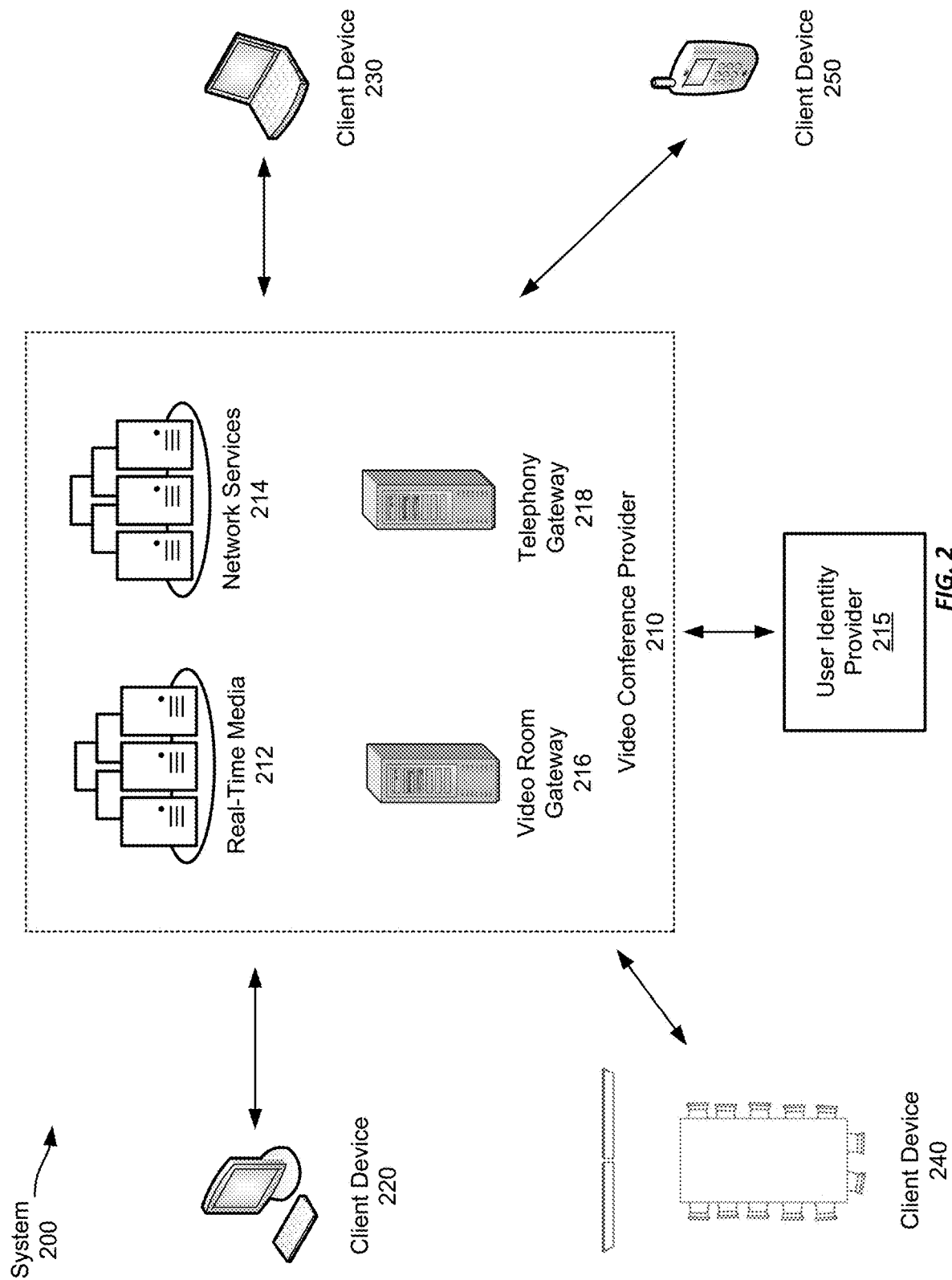

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
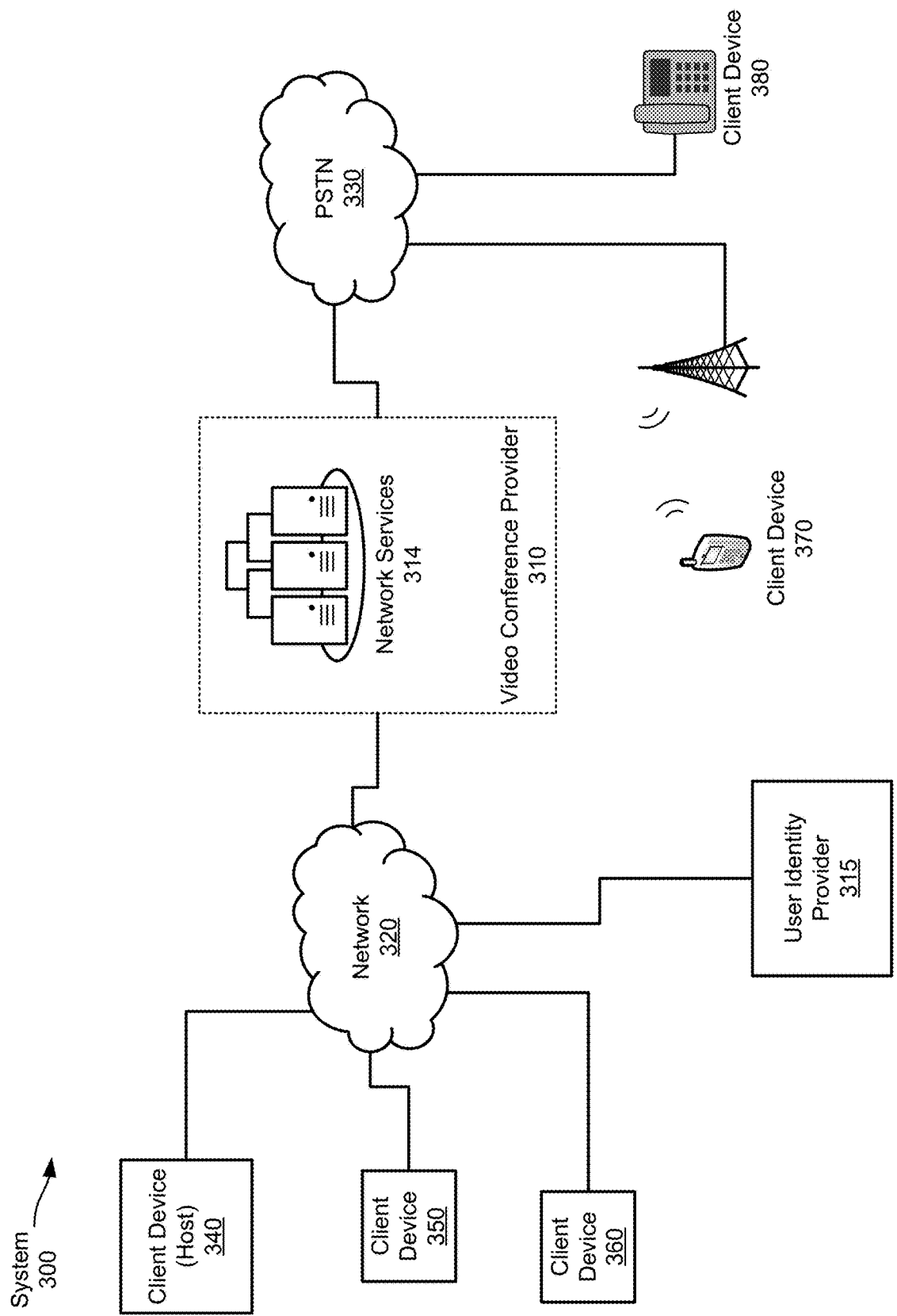

Referring now to FIG. 3, FIG. 3 illustrates an example system 300 for controlling online meeting attendance that includes components similar to those shown in FIGS. 1 and 2. In this example, the system includes a public user identity provider 315 through which individuals can establish identities that may be used to access various online services, including video conference services provided by the video conference provider 310. In this example, when users attempt to access video conferences hosted by the video conference provider 310, the video conference provider 310 attempts to verify each participant, such as by communicating with the user identity provider 315.

When a user establishes an identity with the user identity provider 315, they provide certain personal information, such as a name, address, birth date, email address(es), etc. The user identity provider 315 may then establish an identity for the user that provides certain functionality, such as an identity indicator (e.g., an account or user name), cryptographic signatures, etc., that the user may employ to access various online services. In some examples, the user may be able to connect to the video conference provider 310 and login into an account with the video conference provider 310 using the user identity provider 315 to access functionality provided by the video conference provider 310. However, in some examples, a participant or host of a video conference may not have, or may not want, an account with the video conference provider 310.

To accommodate such unregistered users, the video conference provider 310 may require users to provide a user identifier, such as an identity established with the user identity provider, before admitting them to a video conference or allowing them to create a video conference. After receiving the user's identity and potentially additional information, such as cryptographic information, the network services server(s) 314 operated by the video conference provider 310 may communicate with the user identity provider 315 to verify that the identity is valid and to authenticate the user. After verifying the user's identity, the video conference provider 310 may then at admit them to a scheduled meeting or allow them to host a scheduled meeting.

Using such a publicly available user identity provider may provide broader access to video conferencing services without requiring individuals to register with the video conference provider. This may reduce the burden on the user, who may instead be able to use an existing identity.

Figure 4:
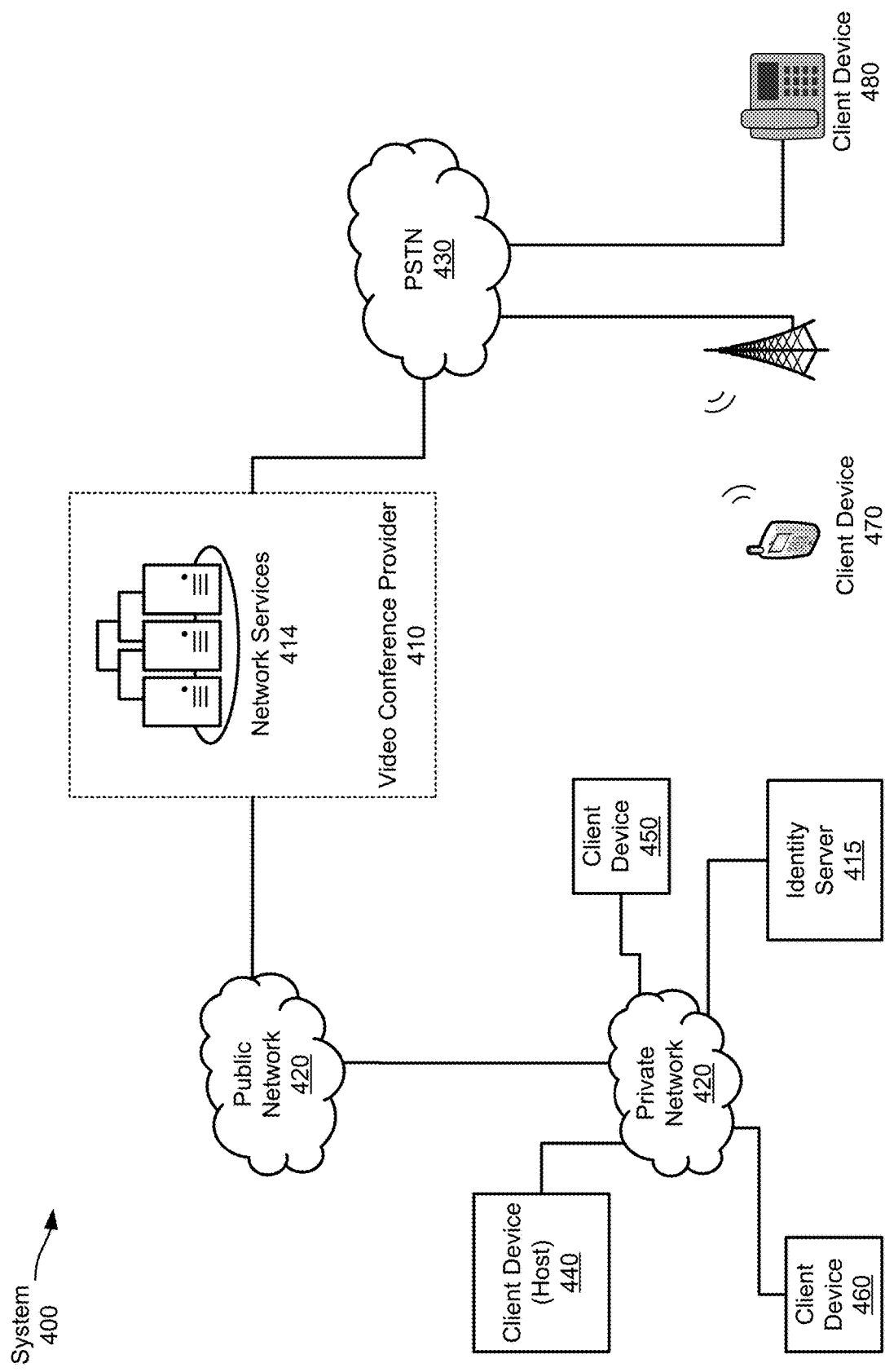

Referring to FIG. 4, FIG. 4 shows another example system 400 for controlling online meeting attendance that includes components similar to those shown in FIGS. 1-3; however, the system 400 shown in FIG. 4 involves multiple client devices 440-460 that are connected to a private network 420, such as at a business. To access the private network 420, users must supply access credentials, such as a user name and password, which is verified by an identity server 415. If a user supplies valid credentials, they may access the private network 420 and resources available through it.

Users connected to the private network 420 may wish to make use of video conferencing services provided by a video conference provider 410 but, as discussed above with respect to FIG. 3, may not wish to register a user account with the video conference provider 410. To accommodate such users, the video conference provider may verify users similarly to the process discussed above with respect to FIG. 3; however, in this example, the network services server(s) 414 operated by the video conference provider may communicate with the identity server 415 to authenticate users that are accessing the private network 420. Thus, in this example, a user attempting to access the video conferencing provider 410 while connected to the private network may be authenticated by the video conferencing provider 410 via communications with the identity server 415. Such an example may enable a user to provide their username for the private network to the video conferencing provider, which may then allow the video conferencing provider to verify their identity and thus allow access to a meeting, whether as a participant or as a host. However, if users external to the private network attempt to join the meeting, the video conference provider 410 may need to authenticate the user, such as by communicating with an external user identity provider, such as described above with respect to FIG. 3. Thus, while identity providers may be public or private, video conference providers according to this disclosure may communicate with any suitable such identity provider to authenticate users before providing access to a meeting, either as a participant or as a host.

In some examples, the video conference provider 410 may attempt to authenticate one or more participants based on factors other than their identity, e.g., their username in the private network. For example, some users that have access to the private network, e.g., because they are employees of the company that maintains the network, however they may be working remotely using a company-issued client device, such as a laptop. Thus, when such a user attempts to join the video conference, the video conference provider 410 may receive device information from the user's client device, such as its device ID. The video conference provider 410 may then request the identity server 415 authenticate the user based on the device ID. If the device ID matches an authorized client device, the identity server 415 may authenticate the user based on the device ID alone or in combination with other information, such as the user's provided identity information, as discussed above, or based on other information, such as biometric information or location information, as discussed below.

In another example, the user may be required to provide biometric information when accessing a client device or when attempting to join a video conference, such as a secured video conference during which confidential information may be shared. Thus, the user may provide biometric information, such as a fingerprint or a retinal scan, via an input device on or connected to their client device. Such information may be provided to the video conference provider 410, optionally encrypted, which may then request authentication of the user from the identity server 415. The identity server 415 may then determine whether the received biometric information corresponds to stored biometric information for the user. In a further example, one or more user's client devices may provide location information corresponding to the geographic location of the respective client device, e.g., based on a Wi-Fi, cellular, or satellite positioning system. Such information may be provided to the video conference provider 410 along with the user's request to join the video conference. The video conference provider 410 may provide such information to the identity server 415, which may determine whether to authenticate the user based on such information. For example, the identity server 415 may refuse to authenticate users located in prohibited regions, e.g., due to export control regulations. The identity server 415 may use any or all such information to determine whether to authenticate a user to the video conference provider 410.

Figure 5:
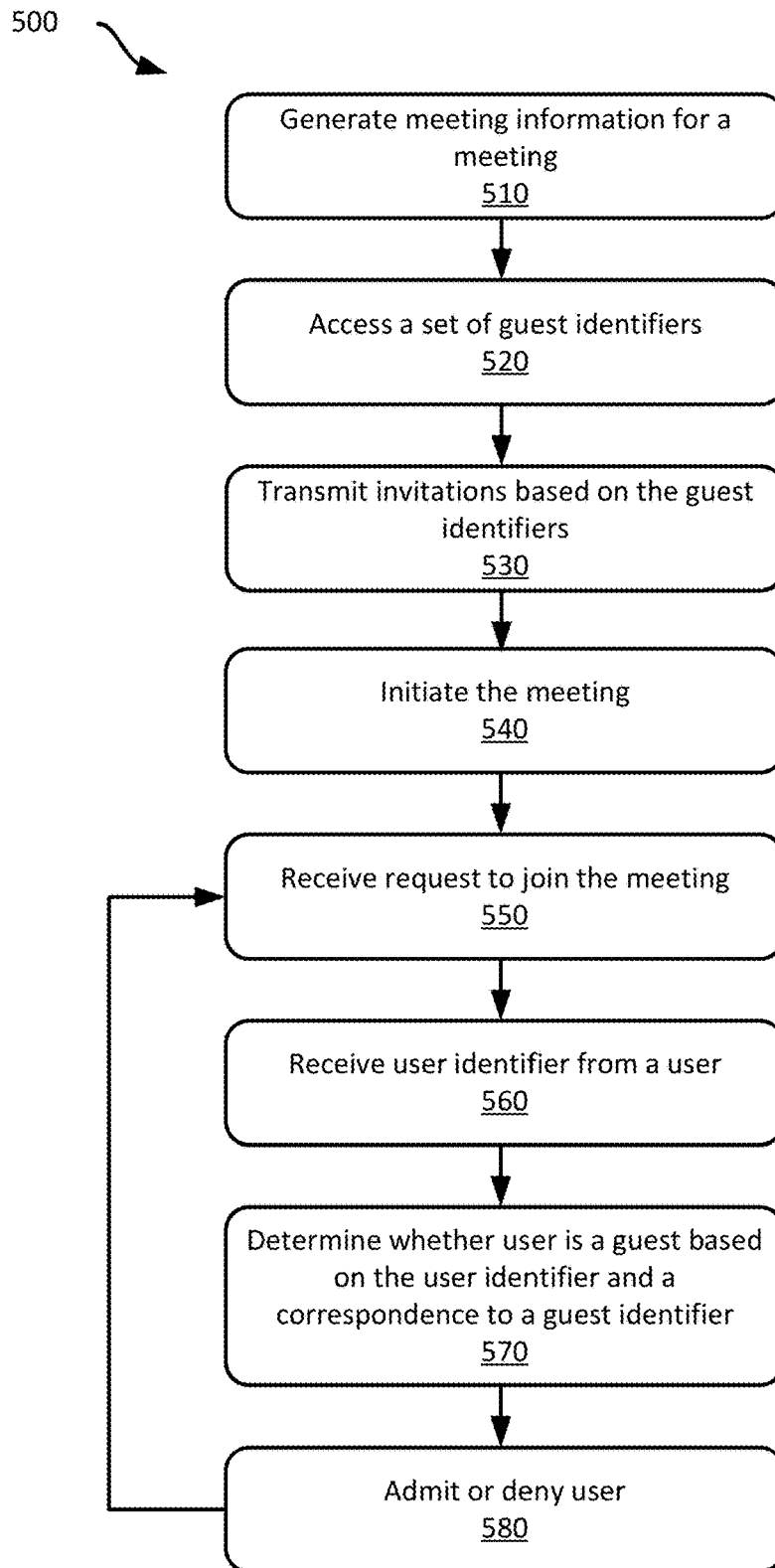
FIGS. 5-6 illustrate example methods for controlling online meeting attendance.

Referring now to FIG. 5, FIG. 5 illustrates an example method 500 for controlling online meeting attendance. The description of the method 500 in FIG. 5 will be made with reference to the system shown in FIG. 2; however any suitable system according to this disclosure may be used, such as the example systems 100, 300, 400 shown in FIGS. 1, 3, and 4.

At block 510, the video conference system 210 generates meeting information for a meeting. In some examples, the video conference system may generate meeting information, e.g., a meeting identifier and passcode, for a new meeting based on a request from a client device to create a new meeting. The meeting identifier may be any identifier that is unique for the time the meeting is to be scheduled. Given constraints on computer hardware, a globally unique meeting ID may not be possible as identifiers may be reused at a later time. The passcode may be any suitable information needed to obtain access to a meeting associated with the meeting identifier. Thus the passcode can be a sequence of digits, alphanumeric characters, etc. It should be appreciated that a passcode may not be used in all cases. For example, public meetings may not employ a passcode. Further, other types of meeting information may be generated, such as a uniform resource identifier ("URI") (e.g., a uniform resource locator ("URL")) to enable users to access the video conferencing system 210 to join the meeting, security settings that identify a type of encryption or provide an encryption key (e.g., a public key), whether the meeting is recorded by default, etc.

As mentioned above, a host may issue a request to create a meeting. To do so, the meeting host's client device, e.g., one of client devices 220-250, sends a request to create a meeting to the video conference provider 210. In addition to the request to create the meeting, the client device may also provide an invitee list to the video conference provider 210. To initiate such a process, the host may log into an account with the video conference provider 210 and select an option to schedule a new meeting and provide a list of email addresses for various invitees.

In some examples however, it should be appreciated that the request to create a meeting need not be initiated explicitly by a user, but instead may be generated based on contextual information determined by the client device or based on information stored at a third party, e.g., via an email or calendar application hosted by a user identity provider or a chat thread in an online collaboration tool. For example, the user may participate in a text discussion in a messaging platform with one or more other users and suggest scheduling a meeting for Monday at 3 pm. The user's client device may identify the date and time and infer that the user intends to schedule a meeting and may issue a request to create a meeting to the video conference provider 210. The user may then be presented with a notification that a meeting has been scheduled and the other users on the discussion have been included as attendees. In some examples, the request may be identified as provisional or unconfirmed until the user actually attempts to create a meeting. Alternatively, the user may be presented with an option, e.g., a pop-up notification, asking if they would like to schedule a meeting and invite the members of the email chain. If so, the request to create the meeting may be sent to the video conferencing provider.

At block 520 the video conferencing system 210 obtains a set of guest identifiers for the invitees to the meeting. To obtain the guest identifiers, the video conferencing system 210 may receive a set of guest identifiers from the host's client device and associate them with the meeting information, such as when the user is creating the meeting. Or, if the user provides indirect access to the guest list, e.g., from a calendar application hosted by a third party, the video conferencing system may access the user's calendar and retrieve guest identifiers from the calendar entry.

The guest identifiers may be any set of identifiers that are each unique within the set of guest identifiers and where each corresponds to a different meeting guest. For example, guest identifiers may be email addresses or identities established with a third-party user identity provider, e.g., account names managed by a network credential service. Further, in some examples, the guest identifiers may be account names established with the video conference provider 210. It should be appreciated that the guest identifiers need not all be of the same type, e.g., they need not all be email addresses. Rather, any combination of guest identifiers may be used.

It should be appreciated that obtaining the guest identifiers may occur simultaneously with receiving the request to create the meeting or they may be obtained at a different time. Further, in some examples, guest identifiers may not be obtained by the video conferencing system 210. For example, participants may be authenticated based on information other than a guest identifier or the video conference provider 410 may provide all requests to access a video conference to a user identity service without having any stored information about any invitees to the meeting. Instead, the video conference provider 210 may request authentication of any requesting participants and determine whether to admit or deny such users based on a response from a user identity provider 215, as discussed below.

At block 530 the video conferencing system 210 transmits invitations to the invitees based on the guest identifiers. For example, if any guest identifiers are email addresses, the video conference provider 210 may transmit emails or calendar invitations to those invitee. If any guest identifiers are user identities provided by a third party user identity provider, the video conferencing system 210 may transmit the invitations to the identity provider and identify the respective user identities. Such identities may also be email addresses, but may instead be handles that enable communications such as direct messages ("DMs") or group messages, e.g., Slack, social media posts, etc.

It should be appreciated, however, that while some examples according to this disclosure may employ the video conferencing provider 210 to transmit invitations to the various invitees, in some examples, the user may instead communicate meeting invitations to the guests, e.g., by sending an email or a calendar invitation, posting a message to social media, etc. Thus, in some such examples, block 530 may be omitted.

At block 540, the video conference system 210 initiates the meeting. To do so, a network services server 214 may receive a request from the host's client device to start the meeting. To issue the request, the host may select a hyperlink identifying a URL or may manually enter the meeting identifier and passcode into a web page hosted by the video conference provider 210 or into a client application provided by the video conference provider 210.

In response to receiving the request to start the meeting, the video conference provider 210 activates the meeting identifier, such as by updating a record in a database associated with the meeting identifier. In addition, the video conference provider 210 activates an audio or video stream between the host's client device and the video conference provider 210 and assigns the host's client device to a real-time media server 212 through which audio or video data to or from the user's client device will flow. In examples where the meeting information indicates that the meeting is recorded by default, the video conference provider 210 also configures a real time media server 212 to record the audio or video data streamed from the participants.

Once the meeting has been started, other invitees may join the meeting and the method 500 proceeds to block 550. It should be appreciated that guests may attempt to join the meeting before it has started. In which case, they may simply be denied access, or they may be moved into a waiting room to await the meeting starting.

At block 550, the video conferencing provider 210 receives a request to join the meeting from a client device. For example, the client device may navigate to a URL corresponding to the meeting, which may include the meeting identifier and optionally a passcode. Alternatively, the user may access a client application provided by the video conference provider 210 and provide a meeting identifier and passcode, or may perform similar functionality using a web page hosted by the video conference provider. Any other suitable way for a user to request to join a meeting may be employed in other examples. After receiving the request to join the meeting, the method proceeds to block 560.

At block 560, the user provides a user identifier to the video conference provider 210. For example, if the user accesses the meeting using an application or web page provided by the video conferencing provider, the user may enter a user identifier, such as a name, a username for an online identity, an email address, etc. In some examples, other types of user identifiers may be received, such as biometric information, device ID information, location information, etc. Such information may be provided at the same time as the request to join the meeting, though in some examples, the video conference provider 210 may send a request to the user to provide a user identifier after the user has requested to join the meeting. For example, the meeting organizer may configure the meeting to require the user to provide a user identifier to be admitted. In one such example, the video conference provider 210, after receiving the request to join the meeting, determines that the meeting configuration requires the user provide a user identifier and issues a request for the user identifier. After receiving the user identifier, the method proceeds to block 570.

At block 570, the video conference provider 210 determines whether the user is a guest based on the user identifier and a correspondence to one of the guest identifiers. In some cases, a user may provide a user identifier that exactly matches a guest identifier, e.g., an email address or telephone number (such as for a telephony device). In such a case, the video conference provider 210 may simply admit the user based on the match between the user identifier; however, in some examples, the video conference provider 210 may issue a "challenge" to the user, such as by requiring the user enter a one-time code that is sent to the user, e.g., using their email address or via a text message to their telephony device, or by asking the user to answer preselected questions with answers previously provided by the user, e.g., "what is your mother's maiden name?" If the user provides the correct one-time code or response, the video conference provider 210 may determine that the user corresponds to a guest in the set of guest identifiers and the method proceeds to block 580.

However, in some examples, the user may provide a user identifier that is not contained in the set of guest identifiers. Instead, the user may provide a reference to a user identity established with a user identity provider 215. For example, the user may supply a username that they use to access a private networked environment, e.g., at their place of employment. Further, the user identifier may not be provided explicitly by the user. For example, the user's login name for their computing environment may be automatically transmitted to the video conference provider 210 when they attempt to join the meeting without any user action or intervention.

After receiving the username, the video conference provider 210 may fail to find an exact match in the set of guest identifiers. In response the video conference provider 210 may supply the user identifier to the host's client device to determine if the user identifier is a recognized username by the host's networking environment. If so, the host's client device may respond with identity information corresponding to the username, such as an email address or a name. The video conference provider 210 can then attempt to match the received identity information with the one of the guest identifiers in the list of guest identifiers. If a corresponding guest identifier is located, the video conferencing system 210 may determine that the user corresponds to a guest in the set of guest identifiers and the method proceeds to block 580. However, even if a corresponding identity is found in the host's networking environment, further authentication may be employed.

For example, the identity information may include (or consist of) one or more device identifiers for a client device associated with the username. The video conference provider 210 may then interrogate the user's client device to obtain a device name (or it may already have been received from the client device). If the device identifier received from the user's client device matches one of the device identifiers in the identity information, the video conference provider 210 may verify the identity of the user and then determine that the user corresponds to a guest in the set of guest identifiers, at which time the method proceeds to block 580.

Figure 6:
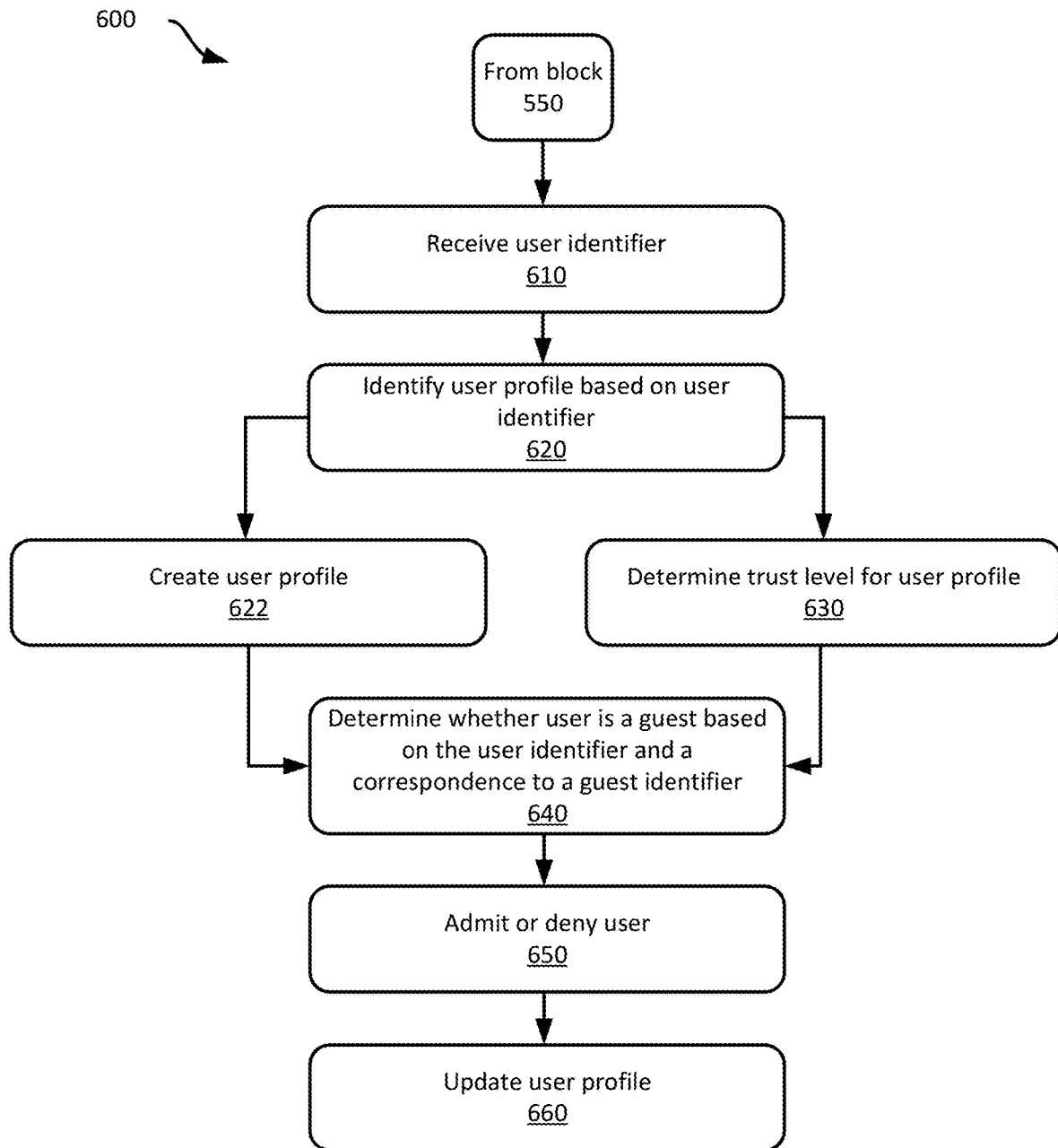

In some examples, to help accelerate determining whether a user corresponds to a guest identifier, the video conference provider 210 may establish a profile for the user, even if the user has not registered for an account with the video conference provider 210. An example of this process is illustrated in FIG. 6 and described in more detail below.

In some examples, the user may supply information, such as biometric information, device ID information, or location information instead of (or along with) other identity information, as discussed above. Such received information may be used to determine whether the user is an authorized guest for the meeting. In examples where a meeting may be open to employees of a corporation or other organization, the list of guest identifiers may be based on records in a human resources system or other information technology system that includes biometric information for the employees of the company, e.g., fingerprint or retinal scan information, device identifiers for authorized client devices, or prohibited locations for attendees of the video conference. The identity provider may use such information to determine whether the user is a guest.

At block 580, the video conference provider 210 determines whether to admit the user to the meeting. Once the video conference provider 210 has determined whether the user is a guest, the method proceeds to block 580. In this example, if the video conference provider 210 determines a correspondence between the user identifier and a guest identifier, it may admit the user to the meeting. However, in some examples, the video conference provider may first attempt to authenticate the user, such as by communicating with a user identity provider 215. As discussed above, it may provide information received from the user and request authentication of the user. This may involve user action, such as by confirming a request from the user identity provider that the video conference provider 210 is authorized to request the user's authentication. Further, in some examples, the video conference provider 210 may issue a challenge to the user and, if the user correctly responds to the challenge, the video conference provider 210 may admit the user to the meeting.

However, if user authentication fails or if no guest identifier is found to correspond to the user identifier, the video conference provider 210 may deny the user access to the meeting, or, in some examples, the video conference provider 210 may move the user into a waiting room and notify the host that the user needs to be admitted (or denied access) to the meeting. The host may then access the waiting room and determine whether to admit the user.

It should be appreciated that the steps discussed above are examples and may be performed in different orders. Further, it should be appreciated that any individual server (or group of servers) within the video conference provider 310 may perform a portion of the method. For example, a server may execute the method beginning from block 550 after a different server has handled the process of creating a new meeting or starting the meeting. Further, and as discussed above, block 530 may be omitted in some examples, or block 520 may not be performed until after a request to join the meeting has been received. Still further variations are contemplated within the scope of this disclosure.

Referring now to the method 600 illustrated in FIG. 6, FIG. 6 shows an example method 600 for controlling online meeting attendance. The description of the method 600 in FIG. 6 will be made with reference to the system 200 shown in FIG. 2; however any suitable system according to this disclosure may be used, such as the example systems 100, 300, 400 shown in FIGS. 1, 3, and 4.

The method begins with blocks 510-550 of the method 500 shown in FIG. 5, which blocks are not repeated in FIG. 6. After block 550 has been completed, the method 600 proceeds to block 610.

At block 610, the video conference provider 210 receive a user identifier generally as described above with respect to block 560.

At block 620, the video conference provider 210 attempts to identify a user profile created for the user based on the supplied user identifier. As mentioned above, the video conference provider 210 may create profiles corresponding to user identifiers, even if the user has not registered with the video conference provider 210. For example, the first time a user provides a username to join a meeting, the video conference provider 210 may attempt to determine whether the user is a guest based on the user identifier and a correspondence to a guest identifier as discussed above with respect to block 570.

If the video conference provider 210 does not have a user profile associated with the user identifier, it may then create one based on the user identifier. Information included in the user profile may be the user identifier, a device ID for the client device the user used to attempt to join the meeting (e.g., a device name, a network ID, a phone number, an international mobile equipment identity (IMEI) number, etc.), a domain name associated with the user or the user's client device, a timestamp (e.g., date and time) corresponding to the attempt to join the meeting, the meeting identifier and passcode, the meeting host, etc. In addition, the video conference provider 210 establishes an initial trust level for the profile, e.g., 0 or untrusted. After creating the user profile, the method proceeds to block 640.

If a user profile associated with the user identifier is identified, the method proceeds to block 630.

At block 630, the video conference provider 210 determines a trust level associated with the user profile. The trust level relates to whether it is likely that the user requesting access to the meeting is actually the user or someone impersonating the user. For example, it may reflect whether the provided user identifier is one that attempts to join meetings to which it is invited and does not have other indicia indicating the user associated with the user identifier is untrusted, e.g., the user profile has a history of disrupting meetings or streaming inappropriate content during a meeting. Creating and updating of a trust level is discussed in more detail below with respect to block 650.

To determine a trust level in this example, the video conference provider 210 extracts the user profile's then-current trust level from the user profile. In some examples, however, a trust level may be determined based on information stored in the user profile. For example, the user profile may include a device ID associated with a device the user has previously used to join meetings. Each time the user joins a meeting with the same device, a trust level associated with the device ID may be increased (potentially up to a maximum value). Thus, the trust value may be determined based on the trust level associated with the device ID. Similarly, if other information within the user profile has associated trust levels, such as meeting hosts the user commonly joins, domain names, etc., such trust levels may be used to determine an aggregate trust level for the user profile. Once the trust level has been determined, the method 600 proceeds to block 640.

At block 640, the video conference provider 210 determines whether the user is a guest based on the user identifier and a correspondence to one of the guest identifiers, generally as discussed above with respect to block 570.

At block 650, the video conference provider 210 determines whether to admit or deny the user to the meeting. In this example, the determination is based on whether the user identifier was determined to be a guest based on the user identifier and a correspondence to a guest identifier. In some examples discussed above with respect to block 570, even if a correspondence is determined, the video conference provider 210 may issue a challenge to the user. However, in an example where the video conference provider 210 maintains a user profile, it may determine whether a trust level associated with the user profile meets or exceeds a threshold trust level. If so, the video conference provider 210 may admit the user to the meeting without issuing a challenge. If the trust level does not satisfy the threshold, however, it may issue a challenge as discussed above or it may deny the user access to the meeting. In some examples, if the trust level does not satisfy the threshold, the video conference provider 210 may notify the meeting host that the user has requested admission to the meeting. For example, the video conference provider 210 may move the user into a waiting room to enable the host to view a video or audio stream from the user to determine the identity of the user and whether the user should be admitted.

After determining whether or not to admit the user to the meeting, the method proceeds to block 660.

At block 660, the video conference provider 210 updates the user profile based on the results of block 640. If the user identifier was determined to correspond to a guest identifier, the video conference provider 210 may update the user profile to include the guest identifier, which may be used in the future to determine a correspondence between a user identifier received by the video conference provider 210 and a guest identifier. The user profile may also be updated with additional information, such as a device identifier of the user's client device or other information discussed above with respect to block 622. Further, the video conference provider 210 may update a trust level associated with data stored in the user profile, as mentioned above with respect to block 630. For example, if the user regularly uses the same device to access meetings or joins meetings hosted by the same user, the video conference provider 210 may maintain a count or other value corresponding to the device identifier or meeting host.

In addition, the video conference provider 210 may also increase a trust level associated with the user profile, e.g., by adding a predetermined value to an existing trust level for information stored in the user profile or to the user profile as a whole. Such a technique may allow the video conference provider 210 to gain confidence that a particular user identifier that requests access to a meeting using a particular device or set of devices or to meetings hosted by the same host or same organization is the user rather than someone impersonating the user.

Using methods according to the example method 600 shown in FIG. 6 may allow the video conference provider to determine whether a user should be admitted to a meeting, but it may also ease the burden on the user by recognizing the user based on past meeting access and information associated with the user, such as devices or meetings they frequently attend.

Figure 7:
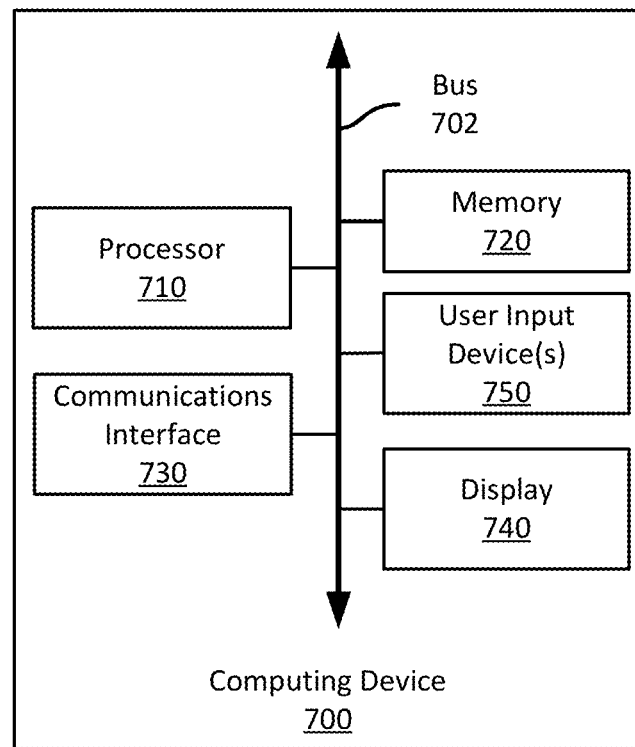
FIG. 7 shows an example computing device suitable for use with any disclosed systems or methods according to this disclosure.

Referring now to FIG. 7, FIG. 7 shows an example computing device 700 suitable for use in example systems or methods for controlling online meeting attendance according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for controlling online meeting attendance according to different examples, such as part or all of the example methods 500, 600 described above with respect to FIGS. 5 and 6. The computing device, in this example, also includes one or more user input devices 750, such as a keyboard, mouse, touchscreen, video input device (e.g., one or more cameras), microphone, etc., to accept user input. The computing device 700 also includes a display 740 to provide visual output to a user.

The computing device 700 also includes a communications interface 740. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   initiating, by a video conferencing system, a virtual meeting;
   receiving, by the video conferencing system from a client device, a request to join the virtual meeting and a user identifier, the video conferencing system not having any stored information identifying any invitees to the virtual meeting;
   determining, based on a response from a user identity provider, that a user associated with the user identifier is authorized to join the virtual meeting; and
   connecting the client device to the virtual meeting.

2. The method of claim 1, further comprising requesting, from the user identity provider, authentication of the user identifier.

3. The method of claim 1, further comprising establishing, by the video conferencing system, a profile for the user based on the user identifier and the response from the user identity provider.

4. The method of claim 1, further comprising, before connecting the client device to the virtual meeting, connecting the client device to a waiting room.

5. The method of claim 1, further comprising:
   issuing a challenge to the client device;
   receiving a response to the challenge; and
   based on validating the challenge, connecting the client device to the virtual meeting.

6. The method of claim 1, further comprising:
   accessing a profile for the user associated with the user identifier;
   determining a trust level for the user; and
   wherein connecting the client device to the virtual meeting is based on the trust level.

7. The method of claim 6, further comprising:
   in response to the trust level satisfying a threshold, issuing a challenge to the client device;
   receiving a response to the challenge; and
   based on validating the challenge, connecting the client device to the virtual meeting.

8. A system comprising:
   a communications interface;
   a non-transitory computer-readable medium; and
   one or more processors communicatively coupled to the communications interface and the non-transitory computer-readable medium, the one or more processors configured to execute processor-executable instructions stored in the non-transitory computer-readable medium to:
   initiate, by a video conferencing system, a virtual meeting;
   receive, by the video conferencing system from a client device, a request to join the virtual meeting and a user identifier, the video conferencing system not having any stored information identifying any invitees to the virtual meeting;
   determine, based on a response from a user identity provider, that a user associated with the user identifier is authorized to join the virtual meeting; and
   connect the client device to the virtual meeting.

9. The system of claim 8, wherein the one or more processors are configured to execute further processor-executable instructions stored in the non-transitory computer-readable medium to request, from the user identity provider, authentication of the user identifier.

10. The system of claim 8, wherein the one or more processors are configured to execute further processor-executable instructions stored in the non-transitory computer-readable medium to establish, by the video conferencing system, a profile for the user based on the user identifier and the response from the user identity provider.

11. The system of claim 8, wherein the one or more processors are configured to execute further processor-executable instructions stored in the non-transitory computer-readable medium to, before connecting the client device to the virtual meeting, connect the client device to a waiting room.

12. The system of claim 8, wherein the one or more processors are configured to execute further processor-executable instructions stored in the non-transitory computer-readable medium to:
  issue a challenge to the client device;
  receive a response to the challenge; and
  based on validating the challenge, connect the client device to the virtual meeting.

13. The system of claim 8, wherein the one or more processors are configured to execute further processor-executable instructions stored in the non-transitory computer-readable medium to:
  access a profile for the user associated with the user identifier;
  determine a trust level for the user; and
  wherein connecting the client device to the virtual meeting is based on the trust level.

14. The system of claim 13, wherein the one or more processors are configured to execute further processor-executable instructions stored in the non-transitory computer-readable medium to:
  in response to the trust level satisfying a threshold, issue a challenge to the client device;
  receive a response to the challenge; and
  based on validating the challenge, connect the client device to the virtual meeting.

15. A non-transitory computer-readable medium comprising processor-executable instructions configured to cause one or more processors to:
  initiate, by a video conferencing system, a virtual meeting;
  receive, by the video conferencing system from a client device, a request to join the virtual meeting and a user identifier, the video conferencing system not having any stored information identifying any invitees to the virtual meeting;
  determine, based on a response from a user identity provider, that a user associated with the user identifier is authorized to join the virtual meeting; and
  connect the client device to the virtual meeting.

16. The non-transitory computer-readable medium of claim 15, further comprising processor-executable instructions configured to cause one or more processors to request, from the user identity provider, authentication of the user identifier.

17. The non-transitory computer-readable medium of claim 15, further comprising processor-executable instructions configured to cause one or more processors to establish, by the video conferencing system, a profile for the user based on the user identifier and the response from the user identity provider.

18. The non-transitory computer-readable medium of claim 15, further comprising processor-executable instructions configured to cause one or more processors to, before connecting the client device to the virtual meeting, connect the client device to a waiting room.

19. The non-transitory computer-readable medium of claim 15, further comprising processor-executable instructions configured to cause one or more processors to:
  issue a challenge to the client device;
  receive a response to the challenge; and
  based on validating the challenge, connect the client device to the virtual meeting.

20. The non-transitory computer-readable medium of claim 15, further comprising processor-executable instructions configured to cause one or more processors to:
  access a profile for the user associated with the user identifier;
  determine a trust level for the user; and
  wherein connecting the client device to the virtual meeting is based on the trust level.

* * * * *